United States Patent
Duvert et al.

(10) Patent No.: US 8,087,126 B2
(45) Date of Patent: Jan. 3, 2012

(54) BED IMMOBILIZATION SYSTEM INTEGRATED INTO CHASSIS FEET

(75) Inventors: Jean-Bernard Duvert, Auray (FR); Pascal Guguin, Brech (FR); Frederic Ribera, Besancon (FR)

(73) Assignee: Hill-Rom SAS, Pluvigner (FR)

( * ) Notice: Subject to any disclaimer, the term of this patent is extended or adjusted under 35 U.S.C. 154(b) by 369 days.

(21) Appl. No.: 12/051,198

(22) Filed: Mar. 19, 2008

(65) Prior Publication Data
US 2008/0229545 A1 Sep. 25, 2008

(30) Foreign Application Priority Data
Mar. 19, 2007 (FR) ...................................... 07 53908

(51) Int. Cl. *B60B 33/06* (2006.01)
(52) U.S. Cl. .................... 16/33; 16/32; 16/18 CG; 5/510
(58) Field of Classification Search ................. 16/33, 32, 16/34, 35 R, 18 CG, 18 R; 5/510, 511, 503.1, 5/658; 280/43, 43.17, 43.24, 43.22
See application file for complete search history.

(56) References Cited

U.S. PATENT DOCUMENTS

| | | | | |
|---|---|---|---|---|
| 222,180 A * | 12/1879 | Cutting et al. | ..................... | 16/32 |
| 824,733 A * | 7/1906 | Merrick et al. | ..................... | 16/33 |
| 880,997 A * | 3/1908 | Hymers | ............................. | 16/33 |
| 1,007,022 A * | 10/1911 | Doll | ................................. | 16/32 |
| 1,009,389 A * | 11/1911 | Doll | ................................. | 16/33 |
| 1,064,244 A * | 6/1913 | Neugebauer | ....................... | 16/33 |
| 1,133,798 A * | 3/1915 | Hall | ................................... | 16/32 |
| 1,221,750 A * | 4/1917 | Laird | ................................. | 16/33 |
| 1,268,651 A * | 6/1918 | Walter | .............................. | 16/33 |
| 1,426,327 A * | 8/1922 | Tiffany | ....................... | 280/43.14 |
| 1,749,751 A * | 3/1930 | Bergsten | ........................... | 16/44 |
| 2,097,349 A * | 10/1937 | Sladek | .......................... | 292/338 |
| 2,176,551 A * | 10/1939 | Solem | ............................... | 16/44 |
| 2,262,288 A * | 11/1941 | Klipstein et al. | .............. | 188/152 |
| 2,631,329 A * | 3/1953 | McKean | ........................... | 16/21 |
| 2,655,387 A * | 10/1953 | Cramer | ....................... | 280/43.14 |
| 2,671,242 A * | 3/1954 | Lewis | ................................. | 16/33 |
| 2,687,546 A | 8/1954 | Oppenheimer | | |
| 2,709,827 A * | 6/1955 | Volz | ................................... | 16/33 |
| 2,843,392 A | 7/1958 | Simpkins | | |
| 3,096,991 A | 7/1963 | Crankshaw | | |
| 3,409,105 A | 11/1968 | Clinton | | |
| 3,441,974 A * | 5/1969 | Dean | ................................. | 16/33 |
| 3,878,573 A * | 4/1975 | Boudewyn | ........................ | 5/658 |
| 3,879,796 A | 4/1975 | Whyte | | |
| 4,076,266 A | 2/1978 | Krausz | | |
| 4,077,086 A * | 3/1978 | Butler | ............................... | 16/33 |
| 4,103,391 A * | 8/1978 | Thomsen | .......................... | 16/33 |
| 4,175,783 A | 11/1979 | Pioth | | |

(Continued)

FOREIGN PATENT DOCUMENTS
CH 570802 12/1975
(Continued)

*Primary Examiner* — Victor Batson
*Assistant Examiner* — Jeffrey O Brien
(74) *Attorney, Agent, or Firm* — Barnes & Thornburg LLP

(57) ABSTRACT

A bed leg with a caster, equipped with a braking mechanism that allows the bed to be immobilized is provided. The bed leg comprises a housing, which houses a caster, an actuating mechanism installed in the housing, a pedal joined to a lever and a braking pad mounted on the lower part of the actuating mechanism.

14 Claims, 2 Drawing Sheets

U.S. PATENT DOCUMENTS

| | | | |
|---|---|---|---|
| 4,248,445 A | | 2/1981 | Vassar |
| 4,339,842 A | | 7/1982 | Fontana et al. |
| 4,700,430 A | * | 10/1987 | Raftery .................... 16/18 CG |
| 4,722,114 A | * | 2/1988 | Neumann ................... 16/35 R |
| 4,723,808 A | | 2/1988 | Hines |
| 4,747,180 A | * | 5/1988 | Screen ........................ 16/35 R |
| 4,788,741 A | | 12/1988 | Hilborn |
| 4,896,922 A | | 1/1990 | Guthe |
| 5,001,808 A | * | 3/1991 | Chung ...................... 16/18 CG |
| 5,046,748 A | | 9/1991 | Oat-Judge |
| 5,083,341 A | | 1/1992 | Milbredt et al. |
| 5,133,106 A | | 7/1992 | Milbredt et al. |
| 5,139,116 A | | 8/1992 | Screen |
| D329,011 S | | 9/1992 | Block |
| 5,165,141 A | | 11/1992 | Soltani |
| D340,182 S | | 10/1993 | Soltani |
| 5,259,088 A | * | 11/1993 | Yang ............................... 16/47 |
| D343,787 S | | 2/1994 | Finkeldey et al. |
| D343,788 S | | 2/1994 | Soltani |
| 5,343,988 A | | 9/1994 | Barsch et al. |
| 5,371,920 A | * | 12/1994 | Rainville ................. 16/18 CG |
| 5,377,372 A | | 1/1995 | Rudolf et al. |
| 5,456,336 A | | 10/1995 | Bopp |
| 5,774,936 A | | 7/1998 | Vetter |
| 6,158,757 A | | 12/2000 | Tidcomb |
| 6,240,713 B1 | | 6/2001 | Thomas |
| 6,286,183 B1 | | 9/2001 | Stickel et al. |
| 6,321,878 B1 | | 11/2001 | Mobley et al. |
| 6,353,948 B1 | | 3/2002 | Bolden et al. |
| 6,473,935 B1 | * | 11/2002 | Cherukuri ........................ 16/33 |
| 6,520,460 B2 | * | 2/2003 | Hallberg et al. ........... 248/188.5 |
| 6,865,775 B2 | | 3/2005 | Ganance |
| 2001/0011393 A1 | | 8/2001 | Brooke et al. |
| 2002/0033307 A1 | | 3/2002 | Mobley et al. |
| 2005/0120518 A1 | * | 6/2005 | Thompson et al. ............. 16/320 |

FOREIGN PATENT DOCUMENTS

| | | |
|---|---|---|
| CH | 670 991 A5 | 7/1989 |
| DE | 27 05 958 A1 | 7/1989 |
| DE | 195 16 586 A | 11/1996 |
| GB | 781369 | 8/1957 |
| GB | 2 061718 | 5/1981 |
| GB | 2 192533 | 1/1988 |
| GB | 2261173 A | 5/1993 |
| GB | 2 343 841 A | 5/2000 |
| GB | 2 349 126 A | 10/2000 |
| JP | 10211146 | 8/1998 |
| JP | 11235362 A | 8/1999 |
| WO | WO 0051830 | 9/2000 |

\* cited by examiner

BED IMMOBILIZATION SYSTEM INTEGRATED INTO CHASSIS FEET

The present application claims priority, under 35 U.S.C. §119(a), of French National Application No. 0753908 which was filed Mar. 19, 2007 and which is hereby incorporated by reference herein.

BACKGROUND

The subject matter of the present disclosure concerns a bed leg with a caster wherein said caster is hidden and is equipped with braking means that allow the bed to be immobilized. The subject matter of the present disclosure applies to the field of hospital beds for long-term care facilities, home hospital beds, or beds suitable for use in a geriatric hospital.

SUMMARY

Disclosed is a bed leg that looks conventional, but comprises a caster completely hidden inside it. A bed equipped with such legs rests on the floor by means of casters, but it is normally immobilized by a mechanism integrated into the leg itself and comprising a lever for releasing a brake when one wishes to move the bed.

According to this disclosure, a bed leg with a caster may comprise:
- a tubular housing intended to be attached to a bed frame and comprising an opening at its lower end,
- a caster attached to the inside of this housing and projecting from said opening,
- an actuating mechanism mounted so as to be able to move longitudinally inside said housing,
- a pedal articulated to the upper part of said housing and joined to a lever cooperating with a cam surface defined on the upper part of said actuating mechanism, and
- a braking pad mounted on the lower end of said actuating mechanism so as to prevent the free rotation of the caster when said actuating mechanism is moved downward under the action of the pedal.

In some embodiments, the actuating element is composed of two elements that slide relative to each other, with a first spring interposed between them. The braking force is communicated to said braking pad by the compression of this spring.

In some embodiments, the actuating mechanism comprises a second spring interposed between at least one of the elements and a fixed support point (for example the base of the caster inside the housing) so as to allow said actuating element to move back up into the housing when the pedal is released.

According to a disclosed embodiment, the braking pad rests on the floor all around the caster when the actuating mechanism is moved downward.

The present disclosure also concerns a bed equipped with legs according to the above discussion.

BRIEF DESCRIPTION OF THE DRAWINGS

The subject matter of the present disclosure will be more clearly understood in light of the following description of a currently preferred embodiment of a bed leg according to its principle, given merely as an example and in reference to the attached drawings, in which.

DETAILED DESCRIPTION

Figure 1:
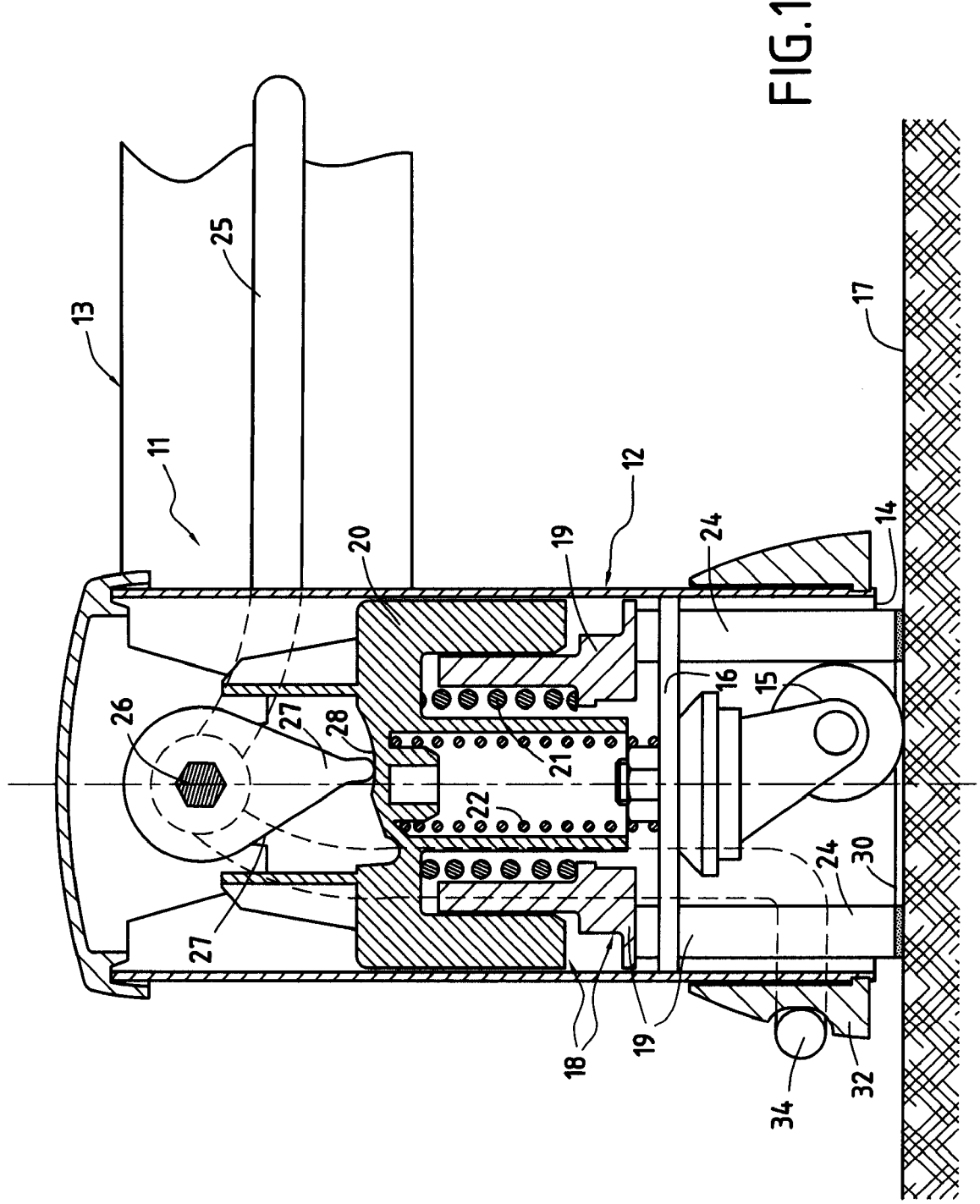
FIG. 1 is a schematic elevational and sectional view of a bed leg according to this disclosure, the system being shown in the braked position of the caster.

The bed leg 11 as shown in this example has an essentially cylindrical overall shape and comprises a vertical tubular housing 12 attached to the bed frame 13. This housing comprises an opening 14 at its lower end. A caster 15 is attached to a bar-shaped base 16, itself welded to the inside of the housing 12. The caster rests permanently on the floor 17 and projects slightly from the opening 14, which is located a slight distance above the floor. Thus, the caster 15 is practically invisible.

An actuating mechanism 18 is installed inside the housing 12 with the capability to move axially. In this example, it is composed of two coaxial elements 19, 20 and two springs, respectively a first spring 21 and second spring 22. The entire actuating mechanism 18 is guided in translation and locked in rotation by the base 16. In essence, the lower element 19 comprises two opposing longitudinal openings 24 by means of which it slides past both ends of the base 16. Moreover, the upper element 20 and the lower element 19 slide one inside the other, but are constrained by longitudinal flat surfaces in mutual contact. Thus, the element 19 is locked in rotation by the support 16, and the element 20 is locked in rotation by the element 19 as a result of these flat surfaces. In other words, the assembly constituted by the two elements 19, 20 can slide longitudinally inside the housing 12. Said first spring 21, which is relatively stiff, is interposed between shoulders of the two elements 19, 20. The second spring 22, which is less stiff, is interposed between the support 16 and the element 20, which it stresses vertically upward. A one-way interlocking system, not visible in the drawings, is provided between the elements 19, 20 so that when the element 20 moves back up into the housing 12 under the stress of the spring 22, it pulls the element 19 with it.

Figure 2:
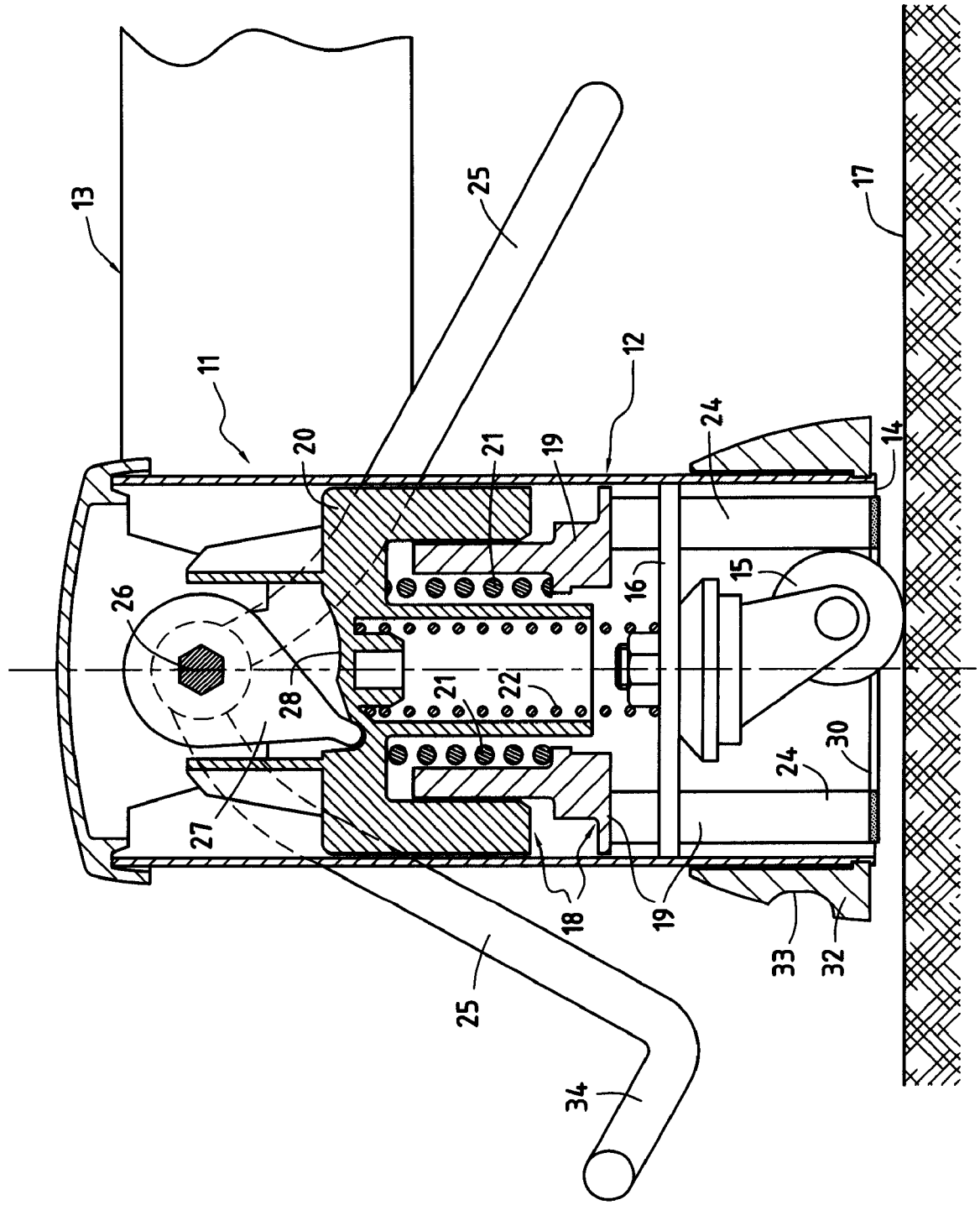
FIG. 2 is a view similar to FIG. 1, in which the system is shown with the caster freed so as to allow the bed to move.

A pedal 25 is articulated to the upper part of the housing 12 by being joined to a transverse bar 26 (of hexagonal cross-section in the example) mounted transversely inside the housing. This bar actually joins two opposing legs of the bed, so that the corresponding brakes are actuated simultaneously. The pedal 25 is joined, via the bar 26, to a pivoting lever 27 that cooperates with a cam surface 28 defined on the upper part of the element 20. In one of the positions (FIG. 1), the actuating mechanism is stressed toward the floor with a compression of the spring 21. In the other position (FIG. 2), the actuating mechanism is returned upward by the spring 22.

The element 19 comprises on its lower end an elastomer braking pad 30, capable of being pressed to the floor 17 when the element 19 is lowered under the stress of the spring 21, which is compressed by the actuation of the pedal 25. The braking pad 30 thus constitutes a brake that is pressed to the floor all around the caster 15.

A decorative collar 32, made of molded plastic material, is attached to the lower end of the housing 12, all around the opening 14 of the latter. It comprises a notch 33 that receives a lower bend 34 of the pedal 25 when the latter is in the position of FIG. 1, i.e. with the caster braked.

In a variant, the actuating mechanism could be shaped so as to press directly onto the caster, and not into the floor all around the latter, as shown in the example described above.

The invention claimed is:

1. A bed leg with a caster, the bed leg comprising:
a tubular housing comprising an upper end and a lower end, said tubular housing adapted to be attached to a bed frame and comprising an opening at its lower end, a base mounted inside the tubular housing and extending horizontally, the base being closer to the lower end of the tubular housing than its upper end, a caster attached to the base inside of the housing and projecting from said opening, the tubular housing surrounding the caster such that a majority of the caster is hidden from view by the housing, an actuating mechanism mounted inside the tubular housing so as to be able to move longitudinally inside said housing, an upper portion of the actuating mechanism being above the base and a lower portion of the actuating mechanism being below the base, the actuating mechanism being guided in translation and locked in rotation by the base, a pedal articulated to said upper end of said housing and joined to a lever cooperating with a cam surface defined on an upper part of said actuating mechanism, and a braking pad mounted on a lower end of said actuating mechanism so as to prevent the free rotation of the caster when said actuating mechanism is moved downward under the action of the pedal, wherein the braking pad is pressed to a floor all around the caster so as to surround a contact area between the caster and the floor when said actuating mechanism is moved downward under the action of the pedal.

2. The bed leg according to claim 1, wherein said actuating mechanism comprises two elements that slide relative to each other, with a first spring interposed between them, a braking force being communicated to said braking pad by the compression of said spring.

3. The bed leg according to claim 2, further comprising a second spring interposed between said actuating mechanism and a fixed support point so as to allow said actuating mechanism to move back up into the housing when the pedal is released.

4. The bed leg according to claim 1, wherein said braking pad comprises an elastomer braking pad.

5. The bed leg according to claim 1, further comprising a collar attached to said lower end of the housing, the collar having a notch that receives a portion of the pedal when the pedal is moved to a braking position.

6. A bed equipped with at least one bed leg according to claim 1.

7. The bed leg according to claim 2, wherein said braking pad comprises an elastomer braking pad.

8. The bed leg according to claim 3, wherein said braking pad comprises an elastomer braking pad.

9. The bed leg according to claim 2, further comprising a collar attached to said lower end of the housing, the collar having a notch that receives a portion of the pedal when the pedal is moved to a braking position.

10. The bed leg according to claim 3, further comprising a collar attached to said lower end of the housing, the collar having a notch that receives a portion of the pedal when the pedal is moved to a braking position.

11. A bed equipped with at least one bed leg according to claim 2.

12. A bed equipped with at least one bed leg according to claim 3.

13. A bed equipped with at least one bed leg according to claim 4.

14. A bed equipped with at least one bed leg according to claim 5.

* * * * *